United States Patent
Wen et al.

(10) Patent No.: US 10,546,474 B2
(45) Date of Patent: Jan. 28, 2020

(54) MOBILE DEVICE AND ANTI-THEFT METHOD THEREOF

(71) Applicant: BOE TECHNOLOGY GROUP CO., LTD., Beijing (CN)

(72) Inventors: Ken Wen, Beijing (CN); Jingquan Wang, Beijing (CN)

(73) Assignee: BOE TECHNOLOGY GROUP CO. LTD., Beijing (CN)

( * ) Notice: Subject to any disclaimer, the term of this patent is extended or adjusted under 35 U.S.C. 154(b) by 0 days.

(21) Appl. No.: 15/953,540

(22) Filed: Apr. 16, 2018

(65) Prior Publication Data

US 2019/0130713 A1 May 2, 2019

(30) Foreign Application Priority Data

Oct. 30, 2017 (CN) .......................... 2017 1 1033646

(51) Int. Cl.
*H04W 24/00* (2009.01)
*G08B 13/22* (2006.01)
*H04W 4/02* (2018.01)
*G08B 13/14* (2006.01)

(52) U.S. Cl.
CPC .......... *G08B 13/22* (2013.01); *G08B 13/1436* (2013.01); *H04W 4/023* (2013.01); *H04W 4/027* (2013.01)

(58) Field of Classification Search
CPC ................ G08B 13/1427; G08B 13/00; G08B 13/19652; H04W 4/02; H04M 1/72516
USPC ....................... 455/404.1, 404.2, 456.1–457; 340/539.13, 988–996; D10/104.2
See application file for complete search history.

(56) References Cited

U.S. PATENT DOCUMENTS 6,865,138 B1* 3/2005 Li .......................... B60Q 9/006
340/436
2009/0164118 A1* 6/2009 Breen .................... G01S 5/0027
701/408
(Continued)

FOREIGN PATENT DOCUMENTS

CN 103957316 A 7/2014
CN 104268481 A 1/2015
(Continued)

OTHER PUBLICATIONS

IP Watchdog article "Beware of Conditional Limitations when Drafting Patent Claims", Aug. 2017, by Vladimir Lozan.*
(Continued)

*Primary Examiner* — Ronald Eisner
(74) *Attorney, Agent, or Firm* — Calfee, Halter & Griswold LLP (57) ABSTRACT

The present disclosure provides a mobile device and an anti-theft method thereof, which relates to the technical field of mobile communication. The anti-theft method of the mobile device includes: detecting a motion parameter of the mobile device, when a distance change relationship between the mobile device and a detected target object satisfies a preset rule; comparing the motion parameter of the mobile device with a standard parameter pre-stored in the mobile device, to judge whether the motion parameter exceeds a threshold range; and triggering the mobile device to sound an alarm when the motion parameter exceeds the threshold range.

17 Claims, 4 Drawing Sheets

(56) References Cited

U.S. PATENT DOCUMENTS

| | | | | |
|---|---|---|---|---|
| 2015/0143497 A1* | 5/2015 | Jin | .................... | G06K 9/00885 |
| | | | | 726/7 |
| 2016/0143800 A1* | 5/2016 | Hyung | .................... | A61H 3/00 |
| | | | | 623/32 |
| 2016/0175681 A1* | 6/2016 | Inagaki | .............. | A63B 69/3632 |
| | | | | 473/223 |
| 2017/0109985 A1* | 4/2017 | Jenkins | .............. | G08B 13/1427 |

FOREIGN PATENT DOCUMENTS

| | | |
|---|---|---|
| CN | 104821068 A | 8/2015 |
| CN | 106056013 A | 10/2016 |
| CN | 107124504 A | 9/2017 |
| KR | 101546346 B1 | 8/2015 |

OTHER PUBLICATIONS

*MPHJ Tech. Invs., LLC* v. *Ricoh Ams. Corp.*, 847 F.3d 1363, 1379 (Fed. Cir. 2017).*
Merriam-Webster Dictionary definition of "parameter", printed on Mar. 20, 2015.*
Random House Online Dictionary definition of "range", printed on Apr. 3, 2019.*
First Office Action for Chinese Patent Application No. 201711033646.X dated Oct. 11, 2019.

* cited by examiner

MOBILE DEVICE AND ANTI-THEFT
METHOD THEREOF

CROSS REFERENCE

The present application claims the priority of Chinese Patent Application No. 201711033646.X, filed on Oct. 30, 2017, and the entire contents thereof are incorporated herein by reference as part of the present application.

TECHNICAL FIELD

The present disclosure relates to the technical field of mobile communication, and in particular, to a mobile device and an anti-theft method thereof.

BACKGROUND

With the rapid development of science and technology, mobile devices such as smartphones continuously impact the mobile phone market with their diversified functions and occupy a dominant position in the mobile phone market. However, frequent cases of smartphones being stolen not only tarnish the social atmosphere but also bring enormous economic losses to users.

At present, in the face of smartphones being stolen, anti-theft software representative by 360 Mobile Security Guard and Tencent Mobile Manger is quietly emerging. The anti-theft software achieves its "anti-theft" function by using GPS (Global Positioning System) location services to locate the location information of the mobile phone after being stolen, and sending instructions to destroy data of the mobile phone by means of the mobile communication technology, or sending instructions to make the mobile phone sound an alarm, or locking the mobile phone, and other manners. However, all the anti-theft measures of the anti-theft software are implemented after the mobile phone was stolen, although it may help users to get back the mobile phone to some extent, it cannot timely prevent the mobile phone from being stolen. In addition, if the operating system of the mobile phone is reinstalled after being stolen, a function of the anti-theft software will be invalidated, and then such software cannot achieve an expected effect.

It should be noted that, information disclosed in the above background portion is provided only for better understanding of the background of the present disclosure, and thus it may contain information that does not constitute the prior art known by those ordinary skilled in the art.

SUMMARY

According to an aspect of the present disclosure, there is provided an anti-theft method of a mobile device, the anti-theft method including:

detecting a motion parameter of the mobile device, when a distance change relationship between the mobile device and a detected target object satisfies a preset rule;

comparing the motion parameter of the mobile device with a standard parameter pre-stored in the mobile device, to judge whether the motion parameter exceeds a threshold range; and triggering the mobile device to sound an alarm when the motion parameter exceeds the threshold range.

In an exemplary of the present disclosure, the preset rule includes:

a distance between the mobile device and the detected target object being decreasing; and a distance between the mobile device and the detected target object being within a threshold distance range for a duration of time exceeding a threshold time.

In an exemplary of the present disclosure, the anti-theft method further includes:

acquiring the distance change relationship between the mobile device and the detected target object, to judge whether the distance change relationship satisfies the preset rule.

In an exemplary of the present disclosure, the acquiring the distance change relationship between the mobile device and the detected target object includes:

detecting a position of the detected target object on a basis of a position of the mobile device;

calculating a real-time distance between the mobile device and the detected target object according to the position of the mobile device and the position of the detected target object; and acquiring the distance change relationship between the mobile device and the detected target object according to the real-time distance between the mobile device and the detected target object.

In an exemplary of the present disclosure, the detecting a motion parameter of the mobile device includes:

detecting a motion trajectory of the mobile device, wherein the motion trajectory is determined by a gravity sensor and an angular velocity sensor of the mobile device.

In an exemplary of the present disclosure, the comparing the motion parameter of the mobile device with a standard parameter pre-stored in the mobile device, to judge whether the motion parameter exceeds a threshold range includes:

comparing the motion trajectory of the mobile device with a standard motion trajectory pre-stored in the mobile device, to judge whether the motion trajectory exceeds a threshold trajectory range.

In an exemplary of the present disclosure, the detecting a motion parameter of the mobile device includes:

detecting an instantaneous speed of the mobile device, wherein the instantaneous speed is determined by an acceleration sensor of the mobile device.

In an exemplary of the present disclosure, the comparing the motion parameter of the mobile device with a standard parameter pre-stored in the mobile device, to judge whether the motion parameter exceeds a threshold range includes:

comparing the instantaneous speed of the mobile device with a standard speed pre-stored in the mobile device, to judge whether the instantaneous speed exceeds a threshold speed.

In an exemplary of the present disclosure, the detecting a motion parameter of the mobile device includes:

detecting a user gait information reflected by the mobile device, wherein the gait information is determined by an acceleration sensor of the mobile device.

In an exemplary of the present disclosure, the comparing the motion parameter of the mobile device with a standard parameter pre-stored in the mobile device, to judge whether the motion parameter exceeds a threshold range includes:

comparing the user gait information reflected by the mobile device with a standard gait information pre-stored in the mobile device, to judge whether the gait information exceeds a threshold gait information range.

In an exemplary of the present disclosure, the anti-theft method further includes:

acquiring a fingerprint information and matching the fingerprint information with a pre-stored fingerprint information in the mobile device, and determining the acquired fingerprint information as an abnormal fingerprint and uploading the abnormal fingerprint to a server in the case where the match fails.

According to an aspect of the present disclosure, there is provided a mobile device, including:

a detector, configured to detect a motion parameter of the mobile device when a distance change relationship between the mobile device and a detected target object satisfies a preset rule;

a comparator, configured to compare the motion parameter of the mobile device with a standard parameter pre-stored in the mobile device, to judge whether the motion parameter exceeds a threshold range; and a controller, configured to trigger an alarm apparatus of the mobile device to sound an alarm when the motion parameter exceeds the threshold range.

In an exemplary of the present disclosure, the mobile device further includes:

a distance detector, configured to acquire the distance change relationship between the mobile device and the detected target object; and a processor, configured to judge whether the distance change relationship satisfies the preset rule.

In an exemplary of the present disclosure, the mobile device further includes:

a fingerprint identifier, configured to acquire a fingerprint information and match the fingerprint information with a pre-stored fingerprint information in the mobile device, and determine the acquired fingerprint information as an abnormal fingerprint and upload the abnormal fingerprint to a server in the case where the match fails.

According to an aspect of the present disclosure, there is provided a mobile device, including:

a processor; and a memory, storing computer readable instructions, wherein the computer readable instructions, when executed, cause the processor to perform:

detecting a motion parameter of the mobile device, when a distance change relationship between the mobile device and a detected target object satisfies a preset rule;

comparing the motion parameter of the mobile device with a standard parameter pre-stored in the mobile device, to judge whether the motion parameter exceeds a threshold range; and triggering the mobile device to sound an alarm when the motion parameter exceeds the threshold range.

In an exemplary of the present disclosure, the preset rule includes:

a distance between the mobile device and the detected target object being decreasing; and a distance between the mobile device and the detected target object being within a threshold distance range for a duration of time exceeding a threshold time.

In an exemplary of the present disclosure, the processor is further configured to perform:

acquiring the distance change relationship between the mobile device and the detected target object, to judge whether the distance change relationship satisfies the preset rule.

In an exemplary of the present disclosure, the acquiring the distance variation relationship between the mobile device and the detected target includes:

detecting a position of the detected target object on a basis of a position of the mobile device;

calculating a real-time distance between the mobile device and the detected target object according to the position of the mobile device and the position of the detected target object; and acquiring the distance change relationship between the mobile device and the detected target object according to the real-time distance between the mobile device and the detected target object.

In an exemplary of the present disclosure, the detecting a motion parameter of the mobile device includes:

detecting a motion trajectory of the mobile device, wherein the motion trajectory is determined by a gravity sensor and an angular velocity sensor of the mobile device.

In an exemplary of the present disclosure, the comparing the motion parameter of the mobile device with a standard parameter pre-stored in the mobile device, to judge whether the motion parameter exceeds a threshold range includes:

comparing the motion trajectory of the mobile device with a standard motion trajectory pre-stored in the mobile device, to judge whether the motion trajectory exceeds a threshold trajectory range.

It is to be understood that both the foregoing general description and the following detailed description are exemplary and explanatory only and are not restrictive of the present disclosure, as claimed.

This section provides a summary of various implementations or examples of the technology described in the present disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. Apparently, the accompanying drawings in the following description show merely some embodiments of the present disclosure, and those skilled in the art may still derive other drawings from these accompanying drawings without creative labor.

DETAILED DESCRIPTION

Example embodiments will now be described more fully with reference to the accompanying drawings. However, the example embodiments may be embodied in many forms and should not be construed as limited to the embodiments set forth herein; rather, these embodiments are provided so that the present disclosure will be thorough and complete, and will fully convey the concepts of the example embodiments to those skilled in the art. The features, structures, or characteristics described herein may be combined in any suitable manner in one or more embodiments. In the following description, numerous specific details are given to provide a thorough understanding of embodiments of the present disclosure. However, those skilled in the art will recognize that the technical solutions of the present disclosure may be practiced without one or more of the specific details, or may adopt other methods, components, apparatuses, steps and the like. In other instances, well-known technical solutions may not be shown or described in detail to avoid obscuring aspects of the present disclosure.

In addition, the drawings are merely schematic representations of the present disclosure and are not necessarily drawn to scale. The thickness and shape of each layer in the figures do not reflect the true scale, but merely for illustrative purposes of the present disclosure. The same reference numeral in the drawings denotes the same or similar part, and thus a repetitive description thereof will be omitted.

Figure 1:
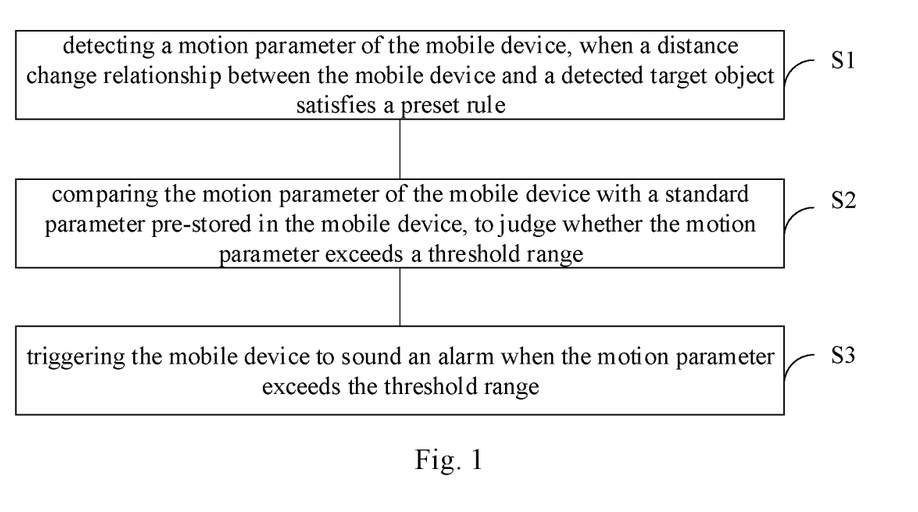
FIG. 1 schematically shows a schematic diagram of an anti-theft method of a mobile device in an exemplary embodiment of the present disclosure.

The exemplary embodiment provides an anti-theft method of a mobile device. As shown in FIG. 1, the anti-theft method of a mobile device may include:

S1: detecting a motion parameter of the mobile device, when a distance change relationship between the mobile device and a detected target object satisfies a preset rule;

S2: comparing the motion parameter of the mobile device with a standard parameter pre-stored in the mobile device, to judge whether the motion parameter exceeds a threshold range; and S3: triggering the mobile device to sound an alarm when the motion parameter exceeds the threshold range.

In the embodiment, for example, the mobile device may be any type of portable electronic device such as a mobile phone, a tablet, a wearable device, and the like. The detected target object refers to other people except an owner of the mobile device, especially refers to suspects who may steal the mobile device.

It should be noted that: the anti-theft method of a mobile device provided in this example embodiment may take effect when a user sets the mobile device in an anti-theft mode in advance as desired.

In the anti-theft method of a mobile device provided by an exemplary embodiment of the present disclosure, a motion parameter of the mobile device may be detected when a distance change relationship between a detected target object and the mobile device satisfies a preset rule, and the motion parameter of the mobile device is compared with a standard parameter pre-stored in a system, to judge whether the holder is the owner of the mobile device. In this way, through the anti-theft method of a mobile device provided in this example embodiment, on one hand, it may identify whether the mobile device is in a stolen state, and then may timely issue an alarm so as to reduce the loss of the mobile device owner; on the other hand, it may further accurately judge whether the holder of the mobile device is the owner of the mobile device, so as to improve the recognition rate of the owner of the mobile device and the detected target object such as a thief, and effectively reduce the probability of false alarms.

The anti-theft method of the mobile device in this exemplary embodiment will be specifically described below with reference to the accompanying drawings.

Before the step S1, the anti-theft method of the mobile device may further include:

S0: acquiring the distance change relationship between the mobile device and the detected target object, to judge whether the distance change relationship satisfies the preset rule.

In this example embodiment, the distance change relationship between the mobile device and the detected target object specifically refers to the relationship of the distance between the mobile device and the detected target object changing over time, which may be obtained by, for example, detecting the relative position relationship between the detected target object and the mobile device in real time.

Based on this, the step S0 may specifically include:

S01: detecting a position of the detected target object on a basis of a position of the mobile device;

S02: calculating a real-time distance between the mobile device and the detected target object according to the position of the mobile device and the position of the detected target object; and S03: acquiring the distance change relationship between the mobile device and the detected target object according to the real-time distance between the mobile device and the detected target object.

In the embodiment, the position of the detected target object may be detected by a distance detecting apparatus, such as a human body proximity sensor. The human body proximity sensor may penetrate a wall to detect the approaching of a human body. A sensing part of the human body proximity sensor not only has a high detection sensitivity to movement of the human body nearby, but also plays a suppressive role to a noise signal in the surrounding environment, with an extremely strong anti-interference ability. The implementation principle of the distance detecting apparatus is not specifically limited by the present embodiment. For example, a distance sensor based on heat, infrared rays, ultrasonic waves, weak radiation and the like, and a positioning apparatus based on GPS, cellular network, near field communication, radio frequency and the like may all be used as the distance detecting apparatus according to the present disclosure.

In this way, in the present, by detecting the distance change relationship between the mobile device and the detected target object in advance and comparing it with a preset rule of the system, a potential crisis may be predicted and the false alarming rate may be improved.

Figure 2:
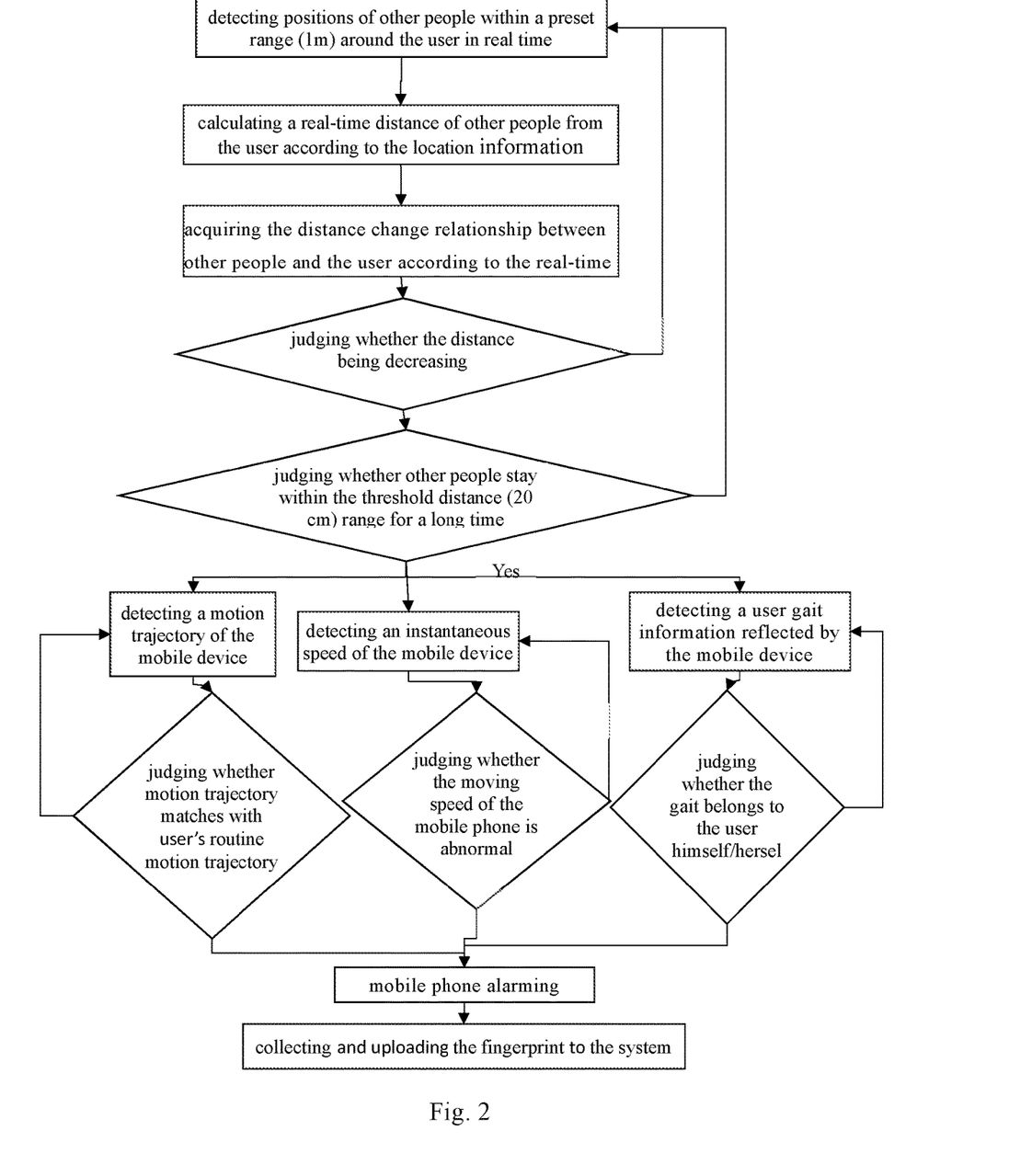
FIG. 2 schematically shows a flow chart of an anti-theft method of a mobile device in an exemplary embodiment of the present disclosure.

For example, as shown in FIG. 2, a user carries a mobile device with an anti-theft function. Such a mobile device may detect positions of other people within a preset range around, for example, within 1 m, in real time. A position of the mobile device itself is served as a starting point, and a real-time distance of other people from the user may be obtained by calculation according to the detected location information of other people. Based on the obtained real-time distance of other people from the use and the detection time, the distance change relationship between other people and the mobile devices may be acquired.

In step S1, a motion parameter of the mobile device is detected when a distance change relationship between the mobile device and a detected target object satisfies a preset rule.

In this example embodiment, the preset rule may include: a distance between the mobile device and the detected target object being decreasing; and a distance between the mobile device and the detected target object being within a threshold distance range for a duration of time exceeding a threshold time. In the embodiment, the threshold distance may be a critical distance that measures the mobile device is in a safety state, for example, 20 cm, and the threshold time may be a critical time that measures the mobile device is in a safety state, for example, 60 s.

For example, referring to FIG. 2, according to the acquired distance change relationship between other people and the mobile device, the mobile device may firstly judge whether the distance change relationship satisfies the change rule of being far to near. On the premise that the change rule is satisfied, it is further judged whether other people stay within a range of the threshold distance such as 20 cm of the mobile device for a long time, that is, it is judged whether a duration of time, during which a distance between other people and the mobile device is within a range of the threshold distance such as 20 cm, exceeds a threshold time such as 60 s. If the above conditions are met at the same time, the motion parameter of the mobile device needs to be detected.

In the embodiment, the motion parameter of the mobile device includes, but not limited to, a motion trajectory of the mobile device, an instantaneous speed of the mobile device, a user gait information reflected by the mobile device, and the like. The motion trajectory of the mobile device may be determined by a gravity sensor and an angular velocity sensor. The instantaneous speed of the mobile device and the user gait information reflected by the mobile device may be determined by an acceleration sensor.

Specifically, the gravity sensor is a cantilever-type displacement device made of a flexible sensing element, and drives an electrical contact in combination with a storage spring made of an elastic sensing element to complete conversion from the gravity to an electrical signal, so as to realize detection of the gravity. The angular velocity sensor converts the sensed angular velocity into an available output signal by using a Coriolis force principle, to achieve measurement of the angular velocity. The acceleration sensor utilizes a piezoelectric effect of the piezoelectric sensing element to obtain a quantity of electric charge or a voltage proportional to the vibration or pressure, so as to achieve detection of the acceleration.

In step S2, the motion parameter of the mobile device is compared with a standard parameter pre-stored in the mobile device, to judge whether the motion parameter exceeds a threshold range.

In this example embodiment, the standard parameter refers to a related motion parameter pre-stored in a system when the owner himself/herself of the mobile device uses the mobile device. The standard parameter has a certain threshold range, and any fluctuation within the threshold range may be regarded as the mobile devices being in a normal state.

In an implementation manner, the step S2 may specifically include: comparing the motion trajectory of the mobile device with a standard motion trajectory pre-stored in the mobile device, to judge whether the motion trajectory exceeds a threshold trajectory range.

For example, referring to FIG. 2, the user may pre-store a plurality of motion trajectories of the mobile phone in commonly used states. A current motion trajectory of the mobile phone is detected by using a gravity sensor and an angular velocity sensor during the use of the mobile phone. By comparing the detected motion trajectory of the mobile phone with the motion trajectories of the mobile phone in commonly used states stored by the user, it may be judged whether the motion trajectory exceeds a threshold trajectory range, thus judging whether the state of the mobile phone is abnormal.

In another implementation, the step S2 may specifically include: comparing the instantaneous speed of the mobile device with a standard speed pre-stored in the mobile device, to judge whether the instantaneous speed exceeds a threshold speed.

For example, referring to FIG. 2, an instantaneous speed range of the mobile phone in normally used states is pre-stored in the mobile phone system. An acceleration sensor is used to detect a current instantaneous speed of the mobile phone during use of the mobile phone. Since a speed of the thief is fast when he/she is stealing the mobile phone, the instantaneous speed of mobile phone is large. By comparing the detected instantaneous speed of the mobile phone with the instantaneous speeds in normally used states pre-stored in the system, it may be judged whether the instantaneous speed exceeds a threshold speed range, thus judging whether the state of the mobile phone is abnormal.

In still another implementation manner, the step S2 may specifically include: comparing the user gait information reflected by the mobile device with a standard gait information pre-stored in the mobile device, to judge whether the gait information exceeds a threshold gait information range.

For example, referring to FIG. 2, different people have different gait information, and the user may pre-store a plurality of user gait information in commonly used states in the mobile phone. During the use of the mobile phone, the user gait information reflected by the mobile phone currently is detected by an acceleration sensor, and the detected user gait information is compared with the user gait information in the commonly used states stored by the user, and then it may be judged whether the gait information exceeds a threshold gait information range, thus judging whether the state of the mobile phone is abnormal.

In step S3, the mobile device is triggered to sound an alarm when the motion parameter exceeds the threshold range.

In this example embodiment, the mobile device is provided with an alarm apparatus and connected to a main control circuit. When it is detected that the state of the mobile device is abnormal, the main control circuit will trigger the alarm apparatus to sound an alarm.

Based on the above process, the effect of detecting whether the state of the mobile device is abnormal and triggering the alarm when the state is abnormal may be achieved. This anti-theft mode may play a role during the process of the mobile phone being stolen, which may timely and effectively avoid loss of the user.

On this basis, in consideration of clues for solving a case after the device is stolen, the anti-theft method may further include:

S4, acquiring a fingerprint information and matching the fingerprint information with a pre-stored fingerprint information in the mobile device, and determining the acquired fingerprint information as an abnormal fingerprint and upload the abnormal fingerprint to a server in the case where the match fails.

In the embodiment, the acquisition and matching of the fingerprint information may be achieved by a fingerprint identifier. In this example embodiment, the fingerprint matching failure may also trigger the mobile device to sound an alarm. Meanwhile, the abnormal fingerprint is uploaded to a server, such as an online personal account, which may provide powerful clues for solving the case in case that an event of the mobile device being stolen occurs, thus conductive to solving the case subsequently.

Figure 3:
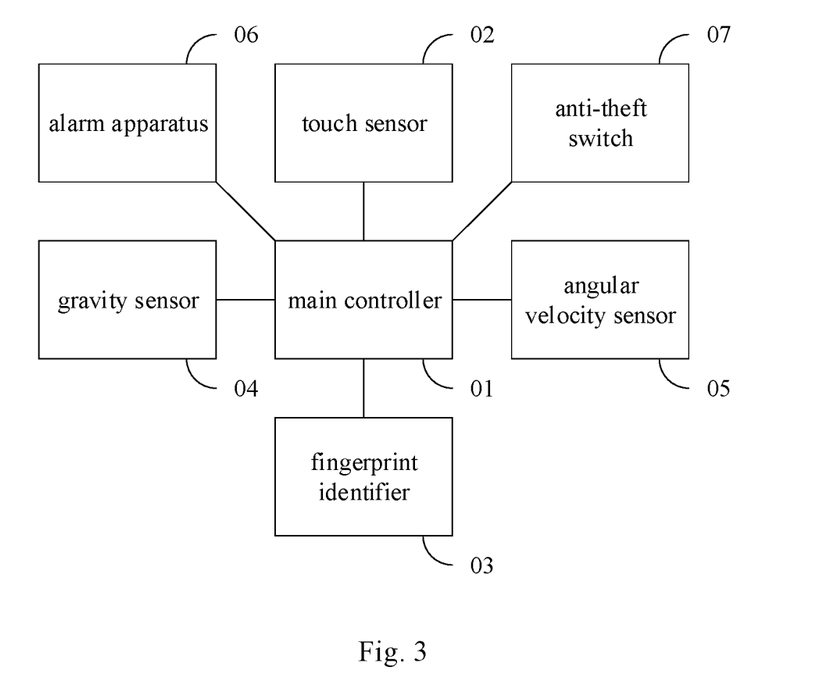
FIG. 3 schematically shows a modular schematic diagram of a mobile device with an anti-theft function according to a comparative example of the present disclosure.

FIG. 3 is a mobile device with an anti-theft function according to a comparative example of the present disclosure. Referring to FIG. 3, the mobile device may include a main controller 01, a touch sensor 02, a fingerprint identifier 03, a gravity sensor 04, an angular velocity sensor 05, an alarm apparatus 06, and an anti-theft switch 07. The main controller 01 is connected to each of other elements and configured to control each of the other elements. In the implementation as shown in FIG. 3, the mobile device may detect its motion trajectory through the gravity sensor 04 and the angular velocity sensor 05, and compare the detected motion trajectory with the motion trajectory pre-stored in the system through the main controller 01, so as to control whether the alarm apparatus 06 sounds an alarm according to the comparison result. However, the mobile device may only judge whether the state of the device is normal by detecting the motion trajectory of the mobile device.

It should be understood that, various elements involved in the present disclosure, such as the gravity sensor, the fingerprint identifier and the like, may be implemented by correspondingly configured hardware, for example, various sensors, detection circuits, logic circuits and the like. However, the present disclosure is not limited thereto. For some elements, in addition to implementation by the hardware, they may also be implemented by computer readable instructions stored in a memory. The computer readable instructions, when executed, may cause a corresponding processor (for example, a central processor, a microprocessor, an application specific integrated circuit, etc.) to perform corresponding operation. For example, the main controller 01 of the present disclosure may be configured as a corresponding logic circuit, or may also be configured as a general-purpose central processor that executes the computer-readable instructions. Similar elements in the following may also be configured in the same manner, and the description will not be repeated in the present disclosure.

Figure 4:
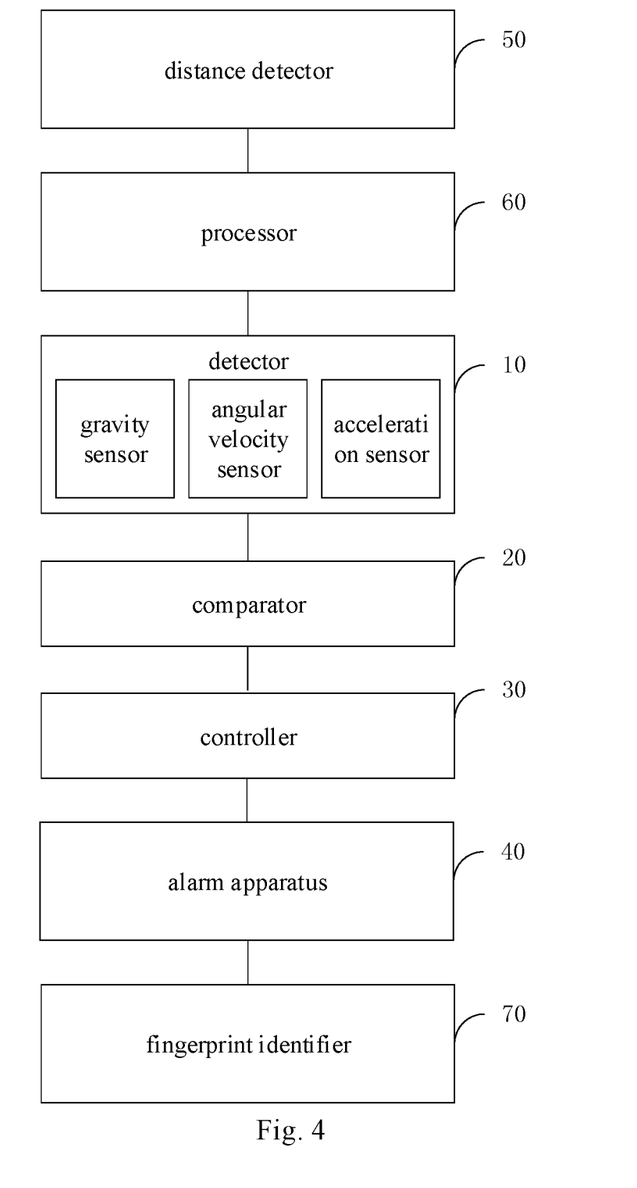
FIG. 4 schematically shows a modular schematic diagram of a mobile device with an anti-theft function in an exemplary embodiment of the present disclosure.

Based on this, the present example implementation further provides a mobile device. As shown in FIG. 4, the mobile device may include:

a detector 10, configured to detect a motion parameter of the mobile device when a distance change relationship between the mobile device and a detected target object satisfies a preset rule;

a comparator 20, configured to compare the motion parameter of the mobile device with a standard parameter pre-stored in the mobile device, to judge whether the motion parameter exceeds a threshold range; and a controller 30, configured to trigger an alarm apparatus 40 of the mobile device to sound an alarm when the motion parameter exceeds the threshold range.

It should be noted that the above functions of the mobile device may be implemented after the user enables an anti-theft mode.

In the mobile device provided by an exemplary embodiment of the present disclosure, a motion parameter of the mobile device may be detected when a distance change relationship between a detected target object and the mobile device satisfies a preset rule, and the motion parameter of the mobile device is compared with a standard parameter pre-stored in a system, to judge whether the holder is the owner of the mobile device. In this way, through the mobile device provided in this example embodiment, on one hand, it may identify whether the mobile device is in a stolen state, and then may timely issue an alarm so as to reduce the loss of the mobile device owner; on the other hand, it may further accurately judge whether the holder of the mobile device is the owner of the mobile device, so as to improve the recognition rate of the owner of the mobile device and the detected target object such as a thief, and effectively reduce the probability of false alarms.

Based on this, as shown in FIG. 4, the mobile device may further include:

a distance detector 50, configured to acquire the distance change relationship between the mobile device and the detected target object; and a processor 60, configured to judge whether the distance change relationship satisfies the preset rule.

In this way, in the present embodiment, by detecting the distance change relationship between the mobile device and the detected target object in advance and comparing it with a preset rule of the system, a potential crisis may be predicted and the false alarm rate may be improved.

Further, referring to FIG. 4, the mobile device may further include:

a fingerprint identifier 70, configured to acquire a fingerprint information and match the fingerprint information with a pre-stored fingerprint information in the mobile device, and determine the acquired fingerprint information as an abnormal fingerprint and upload the abnormal fingerprint to a server in the case where the match fails.

In the present example implementation, the fingerprint identifier 70 may be further connected to a controller 30. When the fingerprint identification fails, the result is fed back to the controller 30, so that the controller 30 triggers the alarm apparatus 40 of the mobile device to sound an alarm.

In this way, the abnormal fingerprint is uploaded to a server, such as an online personal account, which may provide powerful clues for solving the case in case that an event of the mobile device being stolen occurs, thus conductive to solving the case subsequently.

It should be noted that: specific details of each functional element of the mobile device and the implementation manner thereof have been described in detail in the corresponding anti-theft method of a mobile device, and details are not described herein again.

Other embodiments of the present disclosure will readily occur to those skilled in the art upon consideration of the specification and practice of the invention disclosed herein. The present application is intended to cover any variation, use, or adaptive change of the present disclosure that follows general principles of the present disclosure and include common knowledge or conventional technical means in the art which are not disclosed herein. The specification and embodiments are considered as exemplary only, with the true scope and spirit of the present disclosure being indicated by the appending claims.

It should be understood that the present disclosure is not limited to the precise structures that have been described above and shown in the drawings, and that various modifications and changes may be made without departing from the scope thereof. The scope of the present disclosure is limited only by the accompanying claims.

What is claimed is:

1. An anti-theft method of a mobile device, the anti-theft method comprising:

obtaining, by the mobile device, information about a user of the mobile device;

determining, by the mobile device, based on the information, a standard parameter, wherein the standard parameter consisting of a range for routine user trajectory, a range for routine user speed, and a range for routine user gait;

determining, by the mobile device, a motion parameter, wherein the motion parameter consisting of an instantaneous user trajectory, an instantaneous user speed, and an instantaneous user gait;

comparing, by the mobile device, the motion parameter with the standard parameter, to determine whether the motion parameter has exceeded the standard parameter; and triggering, by the mobile device, the mobile device to sound an alarm, based on the motion parameter having exceeded the standard parameter.

2. The anti-theft method according to claim 1, wherein the preset rule comprises:
- a distance between the mobile device and the detected target object being decreasing; and
- a distance between the mobile device and the detected target object being within a threshold distance range for a duration of time exceeding a threshold time.

3. The anti-theft method according to claim 2, further comprising:
- acquiring the distance change relationship between the mobile device and the detected target object, to determine whether the distance change relationship satisfies the preset rule.

4. The anti-theft method according to claim 3, wherein the step of acquiring the distance change relationship between the mobile device and the detected target object comprises:
- detecting a position of the detected target object on a basis of a position of the mobile device;
- calculating a real-time distance between the mobile device and the detected target object according to the position of the mobile device and the position of the detected target object; and
- acquiring the distance change relationship between the mobile device and the detected target object according to the real-time distance between the mobile device and the detected target object.

5. The anti-theft method according to claim 1, wherein the step of detecting a motion parameter of the mobile device comprises:
- detecting a motion trajectory of the mobile device,
- wherein the motion trajectory is determined by a gravity sensor and an angular velocity sensor of the mobile device.

6. The anti-theft method according to claim 5, wherein the step of comparing the motion parameter of the mobile device with a standard parameter pre-stored in the mobile device, to determine whether the motion parameter exceeds a threshold range comprises:
- comparing the motion trajectory of the mobile device with a standard motion trajectory pre-stored in the mobile device, to determine whether the motion trajectory exceeds a threshold trajectory range.

7. The anti-theft method according to claim 1, wherein the step of detecting a motion parameter of the mobile device comprises:
- detecting an instantaneous speed of the mobile device,
- wherein the instantaneous speed is determined by an acceleration sensor of the mobile device.

8. The anti-theft method according to claim 7, wherein the step of comparing the motion parameter of the mobile device with a standard parameter pre-stored in the mobile device, to determine whether the motion parameter exceeds a threshold range comprises:
- comparing the instantaneous speed of the mobile device with a standard speed pre-stored in the mobile device, to determine whether the instantaneous speed exceeds a threshold speed.

9. The anti-theft method according to claim 1, wherein the step of detecting a motion parameter of the mobile device comprises:
- detecting a user gait information reflected by the mobile device,
- wherein the gait information is determined by an acceleration sensor of the mobile device.

10. The anti-theft method according to claim 9, wherein the step of comparing the motion parameter of the mobile device with a standard parameter pre-stored in the mobile device, to determine whether the motion parameter exceeds a threshold range comprises:
- comparing the user gait information reflected by the mobile device with a standard gait information pre-stored in the mobile device, to determine whether the gait information exceeds a threshold gait information range.

11. The anti-theft method according to claim 1, further comprising:
- acquiring a fingerprint information and matching the fingerprint information with a pre-stored fingerprint information in the mobile device, and determining the acquired fingerprint information as an abnormal fingerprint and uploading the abnormal fingerprint to a server in the case where the match fails.

12. A mobile device, comprising:
- a processor; and
- a memory, storing computer readable instructions, wherein the computer readable instructions, when executed, cause the processor to perform:
- obtaining, by the mobile device, information about a user of the mobile device;
- determining, by the mobile device, based on the information, a standard parameter, wherein the standard parameter consisting of a range for routine user trajectory, a range for routine user speed, and a range for routine user gait;
- determining, by the mobile device, a motion parameter, wherein the motion parameter consisting of an instantaneous user trajectory, an instantaneous user speed, and an instantaneous user gait;
- comparing, by the mobile device, the motion parameter with the standard parameter, to determine whether the motion parameter has exceeded the standard parameter; and
- triggering, by the mobile device, the mobile device to sound an alarm, based on the motion parameter having exceeded the standard parameter.

13. The mobile device according to claim 12, wherein the preset rule comprises:
- a distance between the mobile device and the detected target object being decreasing; and
- a distance between the mobile device and the detected target object being within a threshold distance range for a duration of time exceeding a threshold time.

14. The mobile device according to claim 13, wherein the processor is further configured to perform:
- acquiring the distance change relationship between the mobile device and the detected target object, to determine whether the distance change relationship satisfies the preset rule.

15. The mobile device according to claim 14, wherein the step of acquiring the distance variation relationship between the mobile device and the detected target comprises:
- detecting a position of the detected target object on a basis of a position of the mobile device;
- calculating a real-time distance between the mobile device and the detected target object according to the position of the mobile device and the position of the detected target object; and
- acquiring the distance change relationship between the mobile device and the detected target object according to the real-time distance between the mobile device and the detected target object.

16. The mobile device according to claim 12, wherein the step of detecting a motion parameter of the mobile device comprises:
    detecting a motion trajectory of the mobile device,
    wherein the motion trajectory is determined by a gravity sensor and an angular velocity sensor of the mobile device.

17. The mobile device according to claim 16, wherein the step of comparing the motion parameter of the mobile device with a standard parameter pre-stored in the mobile device, to determine whether the motion parameter exceeds a threshold range comprises:
    comparing the motion trajectory of the mobile device with a standard motion trajectory pre-stored in the mobile device, to determine whether the motion trajectory exceeds a threshold trajectory range.

* * * * *